A. FRATER, Jr.
LICENSE NUMBER PLATE BRACKET FOR AUTOMOBILES.
APPLICATION FILED AUG. 11, 1920.

1,361,574. Patented Dec. 7, 1920.

Inventor
Andrew Frater, Jr.
by Wilkinson & Giusta
Attorneys

UNITED STATES PATENT OFFICE.

ANDREW FRATER, JR., OF HAVRE, MONTANA.

LICENSE-NUMBER-PLATE BRACKET FOR AUTOMOBILES.

1,361,574.	Specification of Letters Patent.	Patented Dec. 7, 1920.

Application filed August 11, 1920. Serial No. 402,802.

*To all whom it may concern:*

Be it known that I, ANDREW FRATER, Jr., a citizen of the United States, residing at Havre, in the county of Hill and State of Montana, have invented certain new and useful Improvements in License-Number-Plate Brackets for Automobiles; and I do hereby declare the following to be a full, clear, and exact description of the invention, such as will enable others skilled in the art to which it appertains to make and use the same.

The present invention relates to license number plate brackets for automobiles, and has for an object to provide a bracket or holder for the license number plates of automobiles or other vehicles in which an inexpensive and economical structure is provided capable of being readily attached and detached from usual and standard parts of the vehicle construction.

In the accompanying drawings forming a part of this application, and in which similar reference symbols indicate corresponding parts in the several views.

Referring more particularly to the drawings, 1 designates the radiator of an automobile which, according to the usual practice, is mounted at its forward end in parts of the chassis 2 which also carries the bearing block 3 for the crank 4. Bolts 5 are employed to hold the bearing block 3 to the chassis. This is the well known construction of the Ford automobile, and while the invention is shown applied thereto it may be understood that it may with equal facility find application to machines of other manufacture.

According to the invention I provide a bar 6 which is preferably made of metal, such, for instance, as steel, malleable iron or aluminum, being of a suitable thickness and extending edgewise in a vertical direction.

Figure 3:
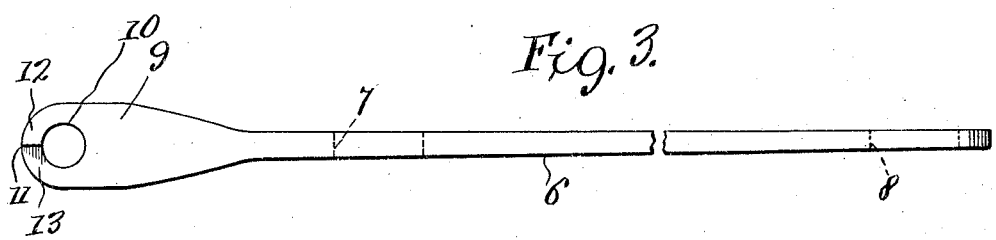
Fig. 3 is an edge view thereof.
Figure 4:
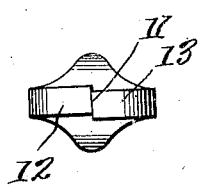
Fig. 4 is a view from one end.
Figure 5:
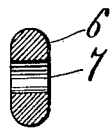
Fig. 5 is a cross sectional view on the line 5—5 in Fig. 2.

As shown to better advantage in Fig. 3, the bar is preferably tapering from the inner to the outer end thereof in order to reduce as much as possible the weight at the outer unsupported end, to conserve material and to enhance the lightness of the same.

Figure 1:
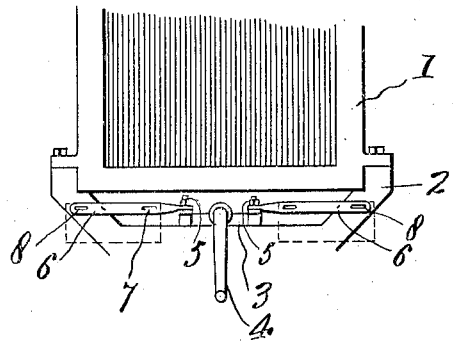
Figure 1 is a fragmentary elevational view of the front of a vehicle showing two of the improved brackets applied thereto.
Figure 2:
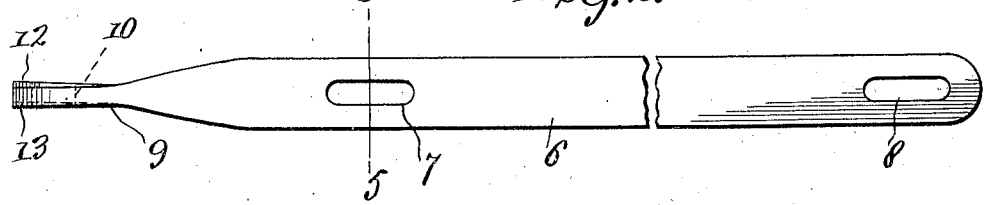
Fig. 2 is a plan view of the bracket.

Slots 7 and 8 are made horizontally through the bar at suitable intervals to receive the bolts or other fastening means by which the license number plates shown in dotted lines in Fig. 1 may be applied thereto.

At the inner end the bar is provided with an extension 9 which is flattened in a horizontal plane or at right angles to the flat side of the major portion of the bar 6. A perforation 10 is made near the extremity of the extension 9, and the material is cut through as indicated at 11 to permit of the divided parts 12 and 13 to be bent or offset in opposite directions. The metal in this case will, of course, be of a resilient or spring character so that when the bolt 5 which engages through the aperture 10 is tightened it will bind the divided parts 12 and 13 between the bolt nut and the bearing block 3, which will result in a tendency to force the parts 12 and 13 into direct alinement; as a consequence the stress inherent in the spring material will exert a pressure upon the nut, causing it to bind against the threads of the bolt 5 and thus forming an effectual frictional thread lock.

The extensions 9 are made of a suitable area to engage as extensive a surface as possible of adjacent parts of the bearing block 3 about the bolt 5, so that a secure purchase for the bar 6 may be had.

It will be noted that the resilient engagement just referred to will not only lock the bars 6 firmly and quickly in place, but it will also prevent rattling when the lock nuts are set up.

While two of these brackets or holders are shown in Fig. 1, it will be apparent that one or more may be employed, and they may be mounted both on the front or rear of vehicles, or in any other place where a bolt affords a point of attachment.

It will therefore be appreciated that I have provided a license plate bracket or holder of an exceedingly cheap construction that is capable of quick and easy attachment to the vehicle, and which will have a swinging movement about the bolt 5 so that it may be accommodated to various positions where it will avoid conflict with other parts.

It will be obvious that those skilled in the art may vary the details of construction and arrangements of parts without departing from the spirit of my invention, and therefore I do not wish to be limited to such features except as may be required by the claim.

I claim:

A license number plate bracket of the character described comprising a bar elongated in a horizontal direction and being flat in a vertical direction, said bar provided with means for receiving fastenings to hold a license number plate thereon, one end of said bar being formed into an ear being flattened in a horizontal direction, said ear being provided with a perforation having a slit opening through the free end of the ear, the material of the ear to opposite sides of the slit being offset in opposite directions, said ear being of spring material whereby pressure put upon opposite sides thereof may cause the portions at the side of the slit to contract into alinement, substantially as described.

ANDREW FRATER, Jr.